(12) United States Patent
Mandera et al.

(10) Patent No.: US 7,904,580 B2
(45) Date of Patent: Mar. 8, 2011

(54) DIGITAL MEDIA PLAYER EXPOSING OPERATIONAL STATE DATA

(75) Inventors: Sandip Mandera, Portland, OR (US); Elizabeth Cordova, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1143 days.

(21) Appl. No.: 11/174,430

(22) Filed: Jun. 30, 2005

(65) Prior Publication Data

US 2007/0006268 A1    Jan. 4, 2007

(51) Int. Cl.
*G06F 15/16* (2006.01)
*G06F 15/173* (2006.01)
*G06F 11/00* (2006.01)
*H04N 7/16* (2006.01)

(52) U.S. Cl. ......... 709/231; 709/219; 709/224; 725/141; 725/147; 714/48

(58) Field of Classification Search .................. 709/219, 709/224, 231; 725/37, 141, 147; 714/48
See application file for complete search history.

(56) References Cited

U.S. PATENT DOCUMENTS

| | | | |
|---|---|---|---|
| 5,671,352 A | | 9/1997 | Subrahmaniam et al. |
| 7,683,903 B2 * | | 3/2010 | Goldhor et al. .............. 345/473 |
| 2004/0039965 A1 | | 2/2004 | Gorshenev et al. |
| 2004/0136327 A1 * | | 7/2004 | Sitaraman et al. ............ 370/252 |
| 2005/0108411 A1 * | | 5/2005 | Kliland et al. ................ 709/230 |
| 2005/0281470 A1 * | | 12/2005 | Adams .......................... 382/232 |
| 2005/0283731 A1 * | | 12/2005 | Saint-Hilaire et al. ........ 715/733 |
| 2006/0159109 A1 * | | 7/2006 | Lamkin et al. ................ 370/401 |
| 2006/0171453 A1 * | | 8/2006 | Rohlfing et al. ......... 375/240.01 |
| 2006/0188096 A1 * | | 8/2006 | Aguilar ......................... 380/200 |
| 2006/0255931 A1 * | | 11/2006 | Hartsfield et al. ....... 340/538.11 |
| 2006/0258289 A1 * | | 11/2006 | Dua ............................. 455/41.3 |
| 2007/0192818 A1 * | | 8/2007 | Bourges-Sevenier et al. ............................ 725/132 |

FOREIGN PATENT DOCUMENTS

WO    WO 02/42923 A1    5/2002
WO    WO 2005/027412 A1    3/2005

OTHER PUBLICATIONS

International Search Report and Written Opinion from PCT/US2006/025759, mailed Oct. 5, 2006, 11 pgs.

* cited by examiner

*Primary Examiner* — Ranodhi N Serrao
(74) *Attorney, Agent, or Firm* — Schwabe, Williamson & Wyatt, P.C.

(57) ABSTRACT

A software based digital media player that provides component interfaces allowing inspection, testing and manipulation of operational state data between the digital media player and a device or devices attached thereto. Providing an opportunity for detailed analysis of such data allows, for example, testing operation of a prototype next-generation device when the corresponding next generation digital media player hardware is non-existent or otherwise hard to acquire for testing purposes. In addition, even were the corresponding next generation digital media player available, it would not provide the same opportunity for detailed analysis as discussed and described herein.

17 Claims, 4 Drawing Sheets

DIGITAL MEDIA PLAYER EXPOSING OPERATIONAL STATE DATA

FIELD OF THE INVENTION

The invention generally relates to digital home/office environments, and more particularly to providing a testing environment including a digital media player allowing for inspection, monitoring, manipulation, etc. of data passing between a prototype device in communication with a the software digital media player.

BACKGROUND

A fundamental change is happening with entertainment—it's going digital. People may now receive digital entertainment on multiple form factors throughout their homes, while at work, while traveling, etc. This presents huge opportunities for content producers and distributors, as did the introduction of radio, movies, television, cable TV, VHS and DVD players. Content producers now have more creative freedom in what they can present, and how it can be presented. Digital distribution models deliver content virtually at any time or any place. The phrases "digital home" and "digital office" are used to represent the hardware and software environments that are being developed to enable diverse digital distribution models in home, office, and other contexts. Each of these contexts includes a network over which content is delivered in the environment.

The Intel® 2003 Networked Media Product Requirements (NMPR) version 1.0 document dated Sep. 12, 2003 describes general principles and structures that may be used to deliver content in digital home, office, and other digital contexts. The Digital Living Network Alliance (DLNA) Home Networked Device Interoperability Guidelines Version: 1.0 dated Jun. 2, 2004 builds on the NMPR (and other such environments) in a cross-industry effort to develop and promote a common industry framework for interoperability of digital home, digital office, etc. devices.

Several basic components of the NMPR and DLNA are described below. The primary focus of the NMPR and DLNA is to enable content interoperability across a network between content sources/hosts and content sinks. Key capabilities include the ability to discover and control content sinks on the network and render content that is discovered dynamically on content sources/hosts. Generally, in the NMPR there are three major high-level logical entities in an environment, Content Sources, Content Hosts, and Content Sinks. Note these logical entities are umbrella terms for devices and/or applications that perform certain roles on the network and each will require a set of differing technologies to implement them. For example, a Content Sink may include an aggregation of multiple devices in order to perform its roles on the network.

Content Sources represent sources of data in the environment, such as digital photos, recorded music, e.g., MP3 files or the like, music delivery services, personal video recordings, video delivery services, etc. Content Sources include applications operating on Content Hosts that provide content and that can be discovered on the network, such as by way of a device discovery protocol such as Universal Plug and Play (UPnP). (Please note that that all marks used herein are the property of their respective owners.) These applications may also provide a user interface (UI) that is remoted (remotely connected) to a remote display device or other Content Sink that allows a user to see, select, play and interact with content. In the DLNA, typical UPnP Content Sources are referred to as Digital Media Servers (DMS).

Content Hosts include platforms that host content provided by Content Sources and provide host stacks that can stream content to Content Sinks. Host stacks may also provide a user interface that is remoted to Content Sinks to allow users to see, select, play and otherwise interact with content from a variety of sources. This content may be a combination of content that is hosted locally on the Content Host and from other network Content Hosts. A user interface may also serve a navigational role by presenting a selection of remoteable user interfaces—much like TV channels—provided by Content Source applications. Host stacks may also support local playback of content located on other Content Hosts.

Content Sinks include devices that play back or render content received over the network from a Content Host. Sinks can also handle user interfaces remoted over the network from a Content Host or Content Source and/or provide a local user interface for the purpose of user control of content selection and playback. In the DLNA, typical UPnP rendering devices or Content Sinks include devices referred to as digital media adapters (DMA) or digital media players (DMP).

While purchasing a device conforming to the NMPR and/or DLNA formats reasonably assures that devices from different developers will interoperate, as a practical matter, providing such interoperability is a non-trivial matter. That is, developing a media product for a digital home typically means your product interacts with other products from different developers using a discovery protocol such as UPnP and a relevant data streaming format, e.g., audio, video, etc. streaming to deliver data from your product to another networked product. It can be difficult to develop, debug and validate one's product. For example, debug and validate streaming functionality of a UPnP-based DMS application, one must send data streams to a DMP (Content Sink). The DMP receives media streams served by the DMS application, decodes the stream, and renders the media stream to an output display device. Unfortunately, if there is a problem, it can be extremely difficult to detect whether an error lies with one's own product, or with another product on the network upon which one's product relies.

BRIEF DESCRIPTION OF THE DRAWINGS

The features and advantages of the present invention will become apparent from the following detailed description of the present invention in which.

DETAILED DESCRIPTION

As noted above, it can be difficult to verify and validate products, such as a UPnP-based Media Server Application or other product when the product is dependent on other devices not in ones control. In particular, without reference designs for a Digital Media Server (DMS) and a Digital Media Player (DMP), along with some way to inspect the data traffic between the DMS and DMP, it can be very difficult to identify a point or points of failure. To assist with such determination, illustrated and claimed are various embodiments to provide for such inspection of data traffic between the DMS and DMP.

Figure 1:
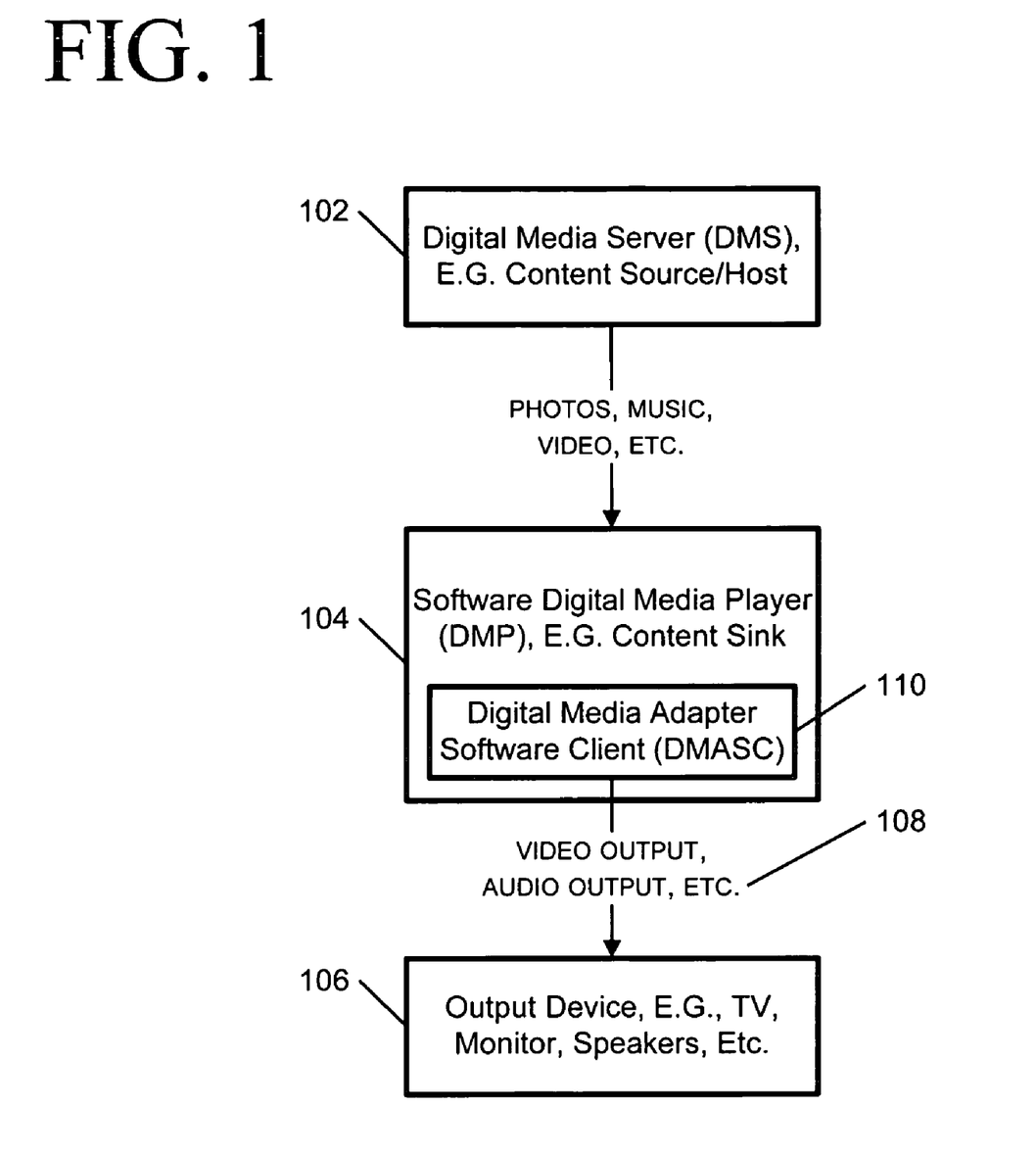
FIG. 1 illustrates a system of devices according to one embodiment.

Towards that end, FIG. 1 illustrates a system 100 of devices according to one embodiment. Illustrated is a Digital Media Server 102, which may be a stand alone device, media center personal computer (PC), software-based DMS, or the like. Note that the Digital Living Network Alliance (DLNA) Home Networked Device Interoperability Guidelines defines the roles and responsibilities of a DMS in great detail; however, generally, a DMS is expected to assist with distributing content throughout a networked environment such as a home, office, or other environ. Note that the principles discussed herein are applicable over small and large scale networks such as the Internet, Wide Area Network (WAN) or the like, e.g., one can stream digital content from one's residence to one's current location, such as one's work place or other location.

Also illustrated is a Digital Media Player (DMP) 104. As with the DMS 102, the DLNA defines the roles and responsibilities of a DMP in detail; however, generally, a DMP is expected to find content exposed (made available) by a DMS and allow that content to be played or rendered on the DMS or associated device. For example, also illustrated is an output device 106, such as a television that can be coupled with the DMP and used to display a video or other data 108 exposed by the DMS. In the illustrated embodiment, the DMP is provided as a software based reference design product that operates as a conventional DMP would, but where the software provides debugging information to allow a developer ability to debug errors in data streams, media streams, UPnP Packets streams, as well to provide for performance analysis such as measuring display frame-rate, recording absolute time when a media frame is received, determining a number of frames dropped, etc.

In one embodiment, the software DMP 104 includes a Digital Media Adapter Software Client (DMASC) 110. Generally, Digital Media Adapters provide a data conduit or bridge between a Content Source/Host such as a home computer providing digital media, e.g., audio data, video data, etc., and an output device 106 such as a stereo, television, etc. In the illustrated embodiment, the DMASC is based at least in part on the Intel Network Media Product Requirements (NMPR) 2.0, and the Digital Living Network Alliance (DLNA) 1.0 specification referenced. It is further expected that in the illustrated embodiment, the host device for the DMASC supports protection of media data, e.g., cryptographic controls for content protection. In one embodiment, the DMASC provides a built-in support for and accessible controls for UPnP audio-video services. However, it will be appreciated other embodiments may support fewer or entirely different requirements.

In the illustrated embodiment, the Digital Media Adapter Software Client (DMASC) 110 includes a debugging feature or tool allowing a developer to undertake debugging and validation of a UPnP-based or other network environment Media Server 102 application. In contrast with a conventional hardware based Digital Media Player (DMP) which does not allow access to its inner workings as this can lead to tampering, operational interference, reverse engineering, etc., the illustrated DMASC, being a software implementation, is able to provide any DMP state information desired in addition to other data such as the status of various communications with the device, e.g., a history of UPnP commands received/sent by the device, a history of network traffic and/or management requests received/sent by the device, etc.

By providing a reference design DMP in software, for the first time it becomes possible to properly debug communications between the DMP and a Digital Media Server (DMS) 102. That is, not only can one see generic network traffic, as would be provided by conventional network "sniffer" products, but illustrated embodiments also provide for filtering and parsing protocol messages, such as to allow one to look for and monitor all or, for example, only certain types of UPnP messages and streamed media messages sent to and from specified applications and DMPs. It will be appreciated that any of a variety of known filtering techniques may be employed to identify network traffic of interest.

Further, it will be appreciated that communications between the DMS 102 and DMP 104 can be analyzed and repackaged as desired for presentation in a more human readable form. For example, assuming the DMP adheres to the Intel® Extended Device Remote Transfer (XRT) Binary Remoting Protocol v2.2 dated February 2005 (a protocol for sending screen bitmaps/snapshots and control commands to a remote rendering device/Sink and to receive user input and state information back from the rendering device/Sink), in one embodiment, the DMASC 110 may be configured to the XRT protocol to display UPnP, XRT, and media data flow in various presentation formats in a graphical user interface, such as an outline view, to allow a software developer to drill down for message details of interest by, for example, double-clicking on packet flow displayed in the graphical user interface. The tool of DMASC may also be configured to alert a developer to errors in format of UPnP or streamed media packets, and assist with logging data for further analysis.

Figure 2:
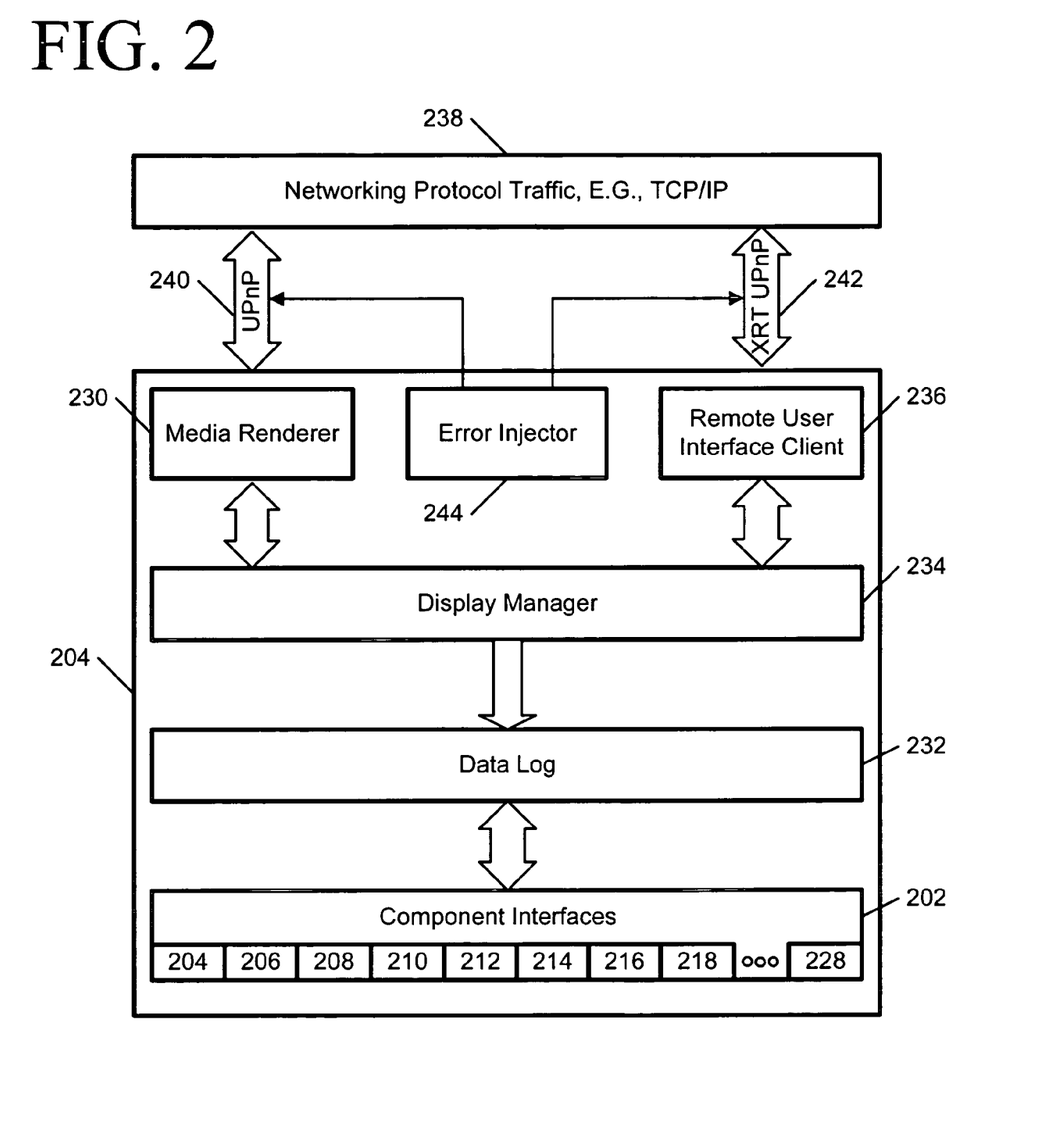
FIG. 2 illustrates an architecture according to one embodiment for providing debugging capabilities in a FIG. 1 Digital Media Adapter Software Client.

FIG. 2 illustrates an architecture 200 according to one embodiment for providing debugging capabilities in the FIG. 1 Digital Media Adapter Software Client (DMASC) 110. The illustrated architecture is expected to be communicatively coupled with a Media Server Control Point (MSCP) (not illustrated), such as one defined with respect to the Digital Living Network Alliance (DLNA). A MSCP enables locating content on a network, such as data provided by various devices on a home network. The MSCP is designed to query UPnP Media Server devices for metadata describing content provided by the devices and how that content can be distributed.

In the illustrated embodiment, the DMASC has a variety of Component Interfaces 202 providing software accessible interfaces to various processing and debug support capabilities. These interfaces may be communicatively coupled with each other, and one may be defined with respect to capabilities provided by another. One such component 204 provides for decoding and rendering a variety of protocols including at least the LPCM, JPEG, MPEG2 and MP3 media formats defined in the Intel® Network Media Product Requirements (NMPR) Specification version 2.0 and Digital Living Network Alliance (DLNA) 1.0 specification, including at least lossy digital image encoding, lossy digital video encoding, and digital audio encoding. It will be appreciated that protocol support can be varied according to needs. In the illustrated embodiment, the Media Rendered 230 may be utilized to render local and/or networked media, and make use of (or alternatively incorporate) component 204 and its protocol and media handling abilities to render JPEG, MPEG-2, LPCM, MP3, etc. data.

The Media Renderer may also support play, stop, pause, fast forward and rewind operations. Hence the Media renderer may use another such component 206 that supports various rendering controls, such as Play, Stop and Pause, trick modes such as Rewind and Fast Forward, Skip, etc. Another such component 208 may support various audio manipulation operations, such as controlling volume of a rendered output media. It will be appreciated that component 208 may be incorporated into the Media Renderer along with components 204, 206.

Another such component 210 may support receiving and processing UPnP messages and XRT 2.2 commands. Another such component 212 may support responding to UPnP Power Management. While the DMASC is not a conventional hardware DMP that can be directed into an appropriate responsive Power Management state, it will be appreciated that the DMASC can put its host environment, e.g., the machine running its program, into an appropriate state. Further, if the DMASC is operating in a virtual machine, the DMASC can respond as if it were a real hardware advice, e.g., the virtual machine's simulated hardware can be put into an appropriate Power Management state.

Another such component 214 may support a Device Stream Quality of Service monitor to facilitate monitoring various characteristics of the Software Digital Media Player 110 or its hosting environment 104 streaming stack, sending feedback to the DMP 110 or host 104, as well as allowing for modifying and/or enhancing data delivery to improve a user's experience. Another such component 216 may support an ability to monitor and inspect all XRT/XRT2 UPnP Audio Visual (AN) and media streaming packets taking place on the home network, e.g., an associated network interface card (or cards) associated with the DMASC may be placed in a promiscuous mode or equivalent or otherwise placed so that it may monitor traffic passing the DMP. It will be appreciated components 214, 216 may be integrated into a single component.

Another such component 218 may support an ability filter data monitored by component 216 so that only data meeting certain interest criteria, such as data for a selected UPnP Media Server device, is monitored. In one embodiment, the monitoring component 218 also may support selecting particular protocol packets, such as only UPnP command packets, meta data contained in streamed media packets, both UPnP and streamed media, all network traffic between a UPnP Media Server device and the DMASC, and the like. It will be appreciated that the filtering criteria can be as diverse as the data environment in which the DMASC is present.

Another such component 220 may support identifying, organizing and collating UPnP commands and other data to allow presenting them, as noted above, in a high level "human readable" fashion. Another such component 222 may support identifying, organizing and collating Media streams and their associated data to allow presenting them, as with component 220, in a high level fashion. Another such component 224 may support logging transactions for messages sent and received over a network. As with component 218, it will be appreciated that various filters may be applied to inspect messages to limit (if desired) the types of data logged. In the illustrated embodiment, a Data Log 232 may save various data such as XRT, UPnP, etc. messages in a repository such as a database, text file, or the like. It will be appreciated that logging controls may be used to control when or how often data is logged, e.g., for a period of time, based on a sampling rate, etc. Various Component Interfaces 204-228 may write entries to the Data Log, or read from the log for data that might result in a component taking action.

It will be appreciated by one skilled in the art that any of the data tracked by components 220, 222, 224 may be presented in a user interface such that more details of any command, media stream, etc. may be displayed in the user interface by double clicking the desired item. In the illustrated embodiment, a Display Manager 234 is communicatively coupled to the Media Renderer 230 and Remote User Interface (RUI) Client 236, and has access to and is able to display networking protocol traffic 238 such as XRT/XRT2 240 and UPnP 242 messages. In the illustrated embodiment, the Display Manager is able to display which UpnP step the UPnP state machine is implementing, display XRT/XRT2 Client (Incoming) and Server (Outgoing) commands, display UpnP incoming and outgoing messages, and display errors and expected data. The RUI Client renders user interfaces received over a network, such as a home network, and sends user input back to a controlling device for processing.

Further, the Display Manager may make use of (or incorporate) another such component 228 that provides for measuring display frame-rate, e.g., rate of data being presented to the FIG. 1 output device 106, recording absolute time (or wall time) for when a frame is received, recording various frame statistics such as the number of frames dropped, missing, corrupted, etc. This component 228 may utilize the capabilities of component 214, and it will be appreciated that all analyzed streams may be recorded for later analysis.

In one embodiment, the Display Manager may use (or incorporate) components 220, 222, 224 and use the RUI Client to generate a user interface for interacting with various data associated with the Component Interface 202. It will be appreciated that this user interface for interacting with the components 204-228 understands the UPnP environment and hence can show packets moving between a media server 102 and a DMP 104. In the illustrated embodiment, also shown is an Error Injector 244 which may be used to artificially introduce data errors, such as UPnP messaging errors at any stage of the UPnP state machine in order to test how well a digital media server 102 (FIG. 1) or digital media player 104 handle error conditions. In addition, specific errors can be introduced in messages to either of these devices to facilitate tracking down origins of detected.

Figure 3:
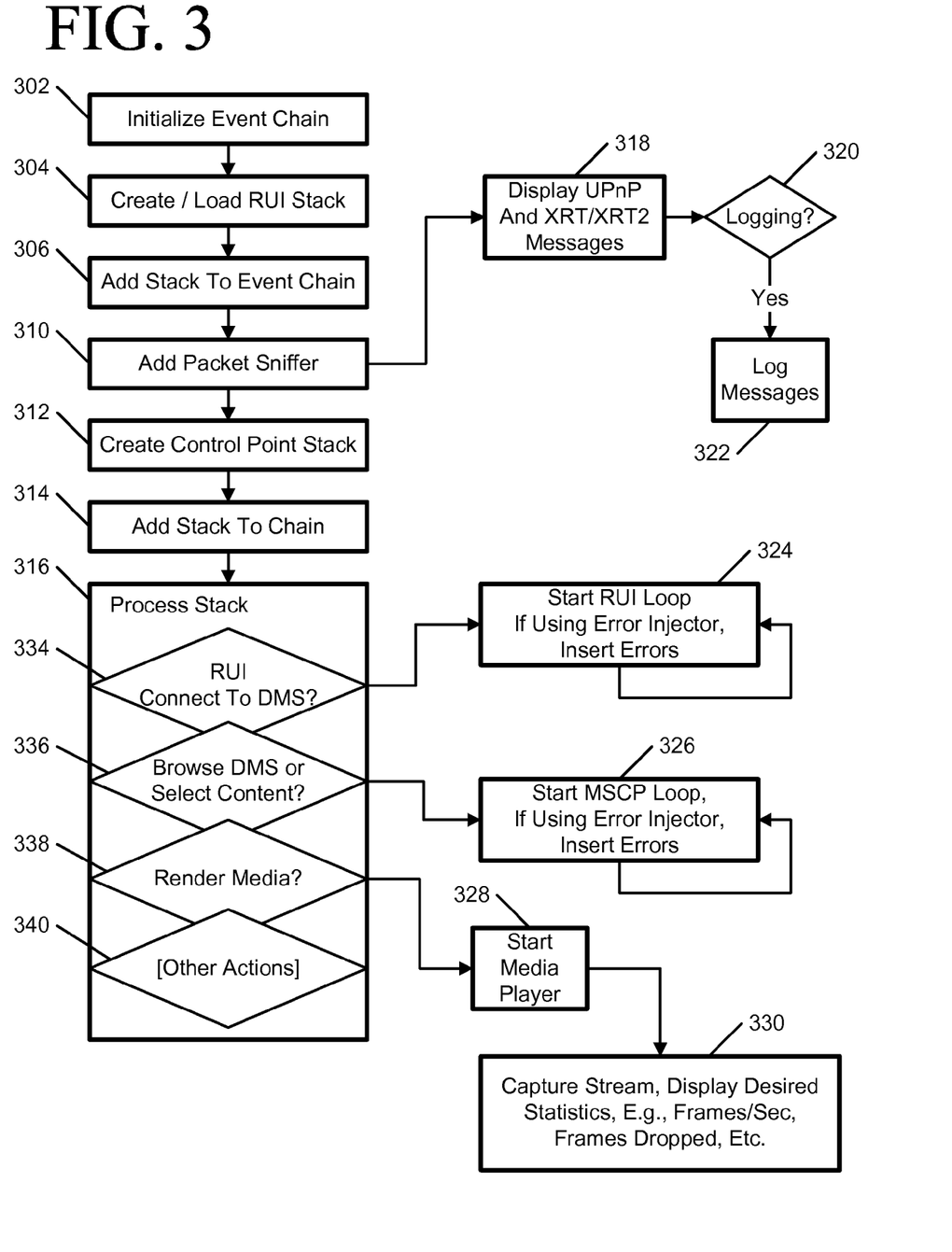
FIG. 3 illustrates a flow chart according to one embodiment utilizing the FIG. 2 architecture to debug, test, and/or monitor interaction between devices in communication with a digital media player.

FIG. 3 illustrates a flow chart 300 according to one embodiment utilizing the FIG. 2 architecture to debug, test, and/or monitor interaction between devices in communication with a digital media player. It will be appreciated that this flowchart is performed in the context of interaction between devices in a digital home/digital office environment, such as the FIG. 1 digital media server (DMS) 102, digital media player (DMP) 104, an output device 106, and the like. It should also be appreciated by one skilled in the art that being able to inspect, modify, test, etc. data passing between different devices such as the DMS and DMP is valuable since these devices are typically provided by different manufacturers and hence one ordinarily is unable to "get into" the internal device states when errors are occur in order to identify which device(s) is causing a problem.

As illustrated a first operation is to initialize an event chain 302. This chain represents the events or tasks that need to be performed in processing the FIG. 3 flow chart, e.g., to perform the desired debugging, testing, monitoring, etc. A subsequent step is to create 304 (or load if a pre-configured starting state is provided) a remote user interface (RUI) stack. As will be appreciated by one skilled in the art, establishing the RUI stack corresponds to establishing a RUI link between, for example, a DMS and a DMP, and allows the DMP to browser services provided by the DMS. Once the RUI stack is created 304, a subsequent operation is to add the RUI stack to the event chain 302 so that it is processed in accord with this illustrated embodiment. Once processing 316 the event loop commences, a subsequent operation is to start the remote user interface loop 324, this is a loop that operates along with the main FIG. 3 processing loop and, as one skilled in the art will appreciate, operates to pick off and process RUI events in the event chain. As discussed with respect to FIG. 2, an error injector 244 may be used to create messaging errors to allow testing for robustness of the devices being debugged, tested, monitored, etc.

Another operation is to add a packet sniffer 310 to the stack. As discussed above with respect to FIG. 2, one may want to display 318 UPnP messages, XRT/XRT2 messages, other network traffic, etc. and adding the sniffer causes its being run on desired network interactions. As discussed above, one may also choose to filter network traffic so that only desired traffic in or out of a desired device is inspected. In addition to displaying selected messages, logging can be enabled; if 320 it is, then desired messages are logged 322, e.g., to the FIG. 2 data log 232.

Another operation is to create a control point stack 312 and add 314 it to the event chain. As is understood by one skilled in the art, a control point stack corresponds to establishing a connection between a DMS and DMP so that the DMP is able/authorized to browse content offerings of the DMS (e.g. see what media it has available), select available media, and choose to render the media with an appropriate rendering device. As with creating the RUI stack, once the control point stack is created and the event chain being processed 316, a Media Server Control Point (MSCP) loop 326 can be started to pick off and process MSCP related events off the event chain. As discussed above, a FIG. 2 error injector 244 may be used to create messaging errors to allow testing for robustness of the devices being debugged, tested, monitored, etc. Once the event chain is being processed, if rendering has been selected by the DMP, then an appropriate media player can be started 328 to render the selected media, and as discussed above, the stream can be captured and various characteristics of the stream displayed 330, such as displayed frames/sec, frames dropped, etc.

After initializing the event chain with various events of interest, e.g., establishing what is to be monitored, tested, etc., the event chain is processed 316. Various tests 334-338 corresponding to the stacks added to the event chain are performed to determine what needs to process a current event in the event chain. Also illustrated is a generic event test to indicate that other stacks not illustrated may also be processed 316.

It will be appreciated by one skilled in the art that by implementing a software based digital media player as discussed above with respect to FIGS. 1-3, one is able to acquire devices from different manufactures yet nonetheless be able to acquire low level internal state information of such devices to facilitate debugging and validating a digital media server (DMS) or other device intended to operate in conjunction with a DMP. Currently Independent Software Vendors (ISV) writing code for a DMS are forced to rely on availability of a hardware-based DMP in order to perform data inspection, testing, debugging, etc. tasks discussed above when trying to validate their Media Server Application. Unfortunately, often times, one is writing code for a next-generation product and hence availability is limited or non-existent for a next-generation hardware product against which to test one's code. The illustrated and described embodiments overcome this by providing a software platform against which to test.

Figure 4:
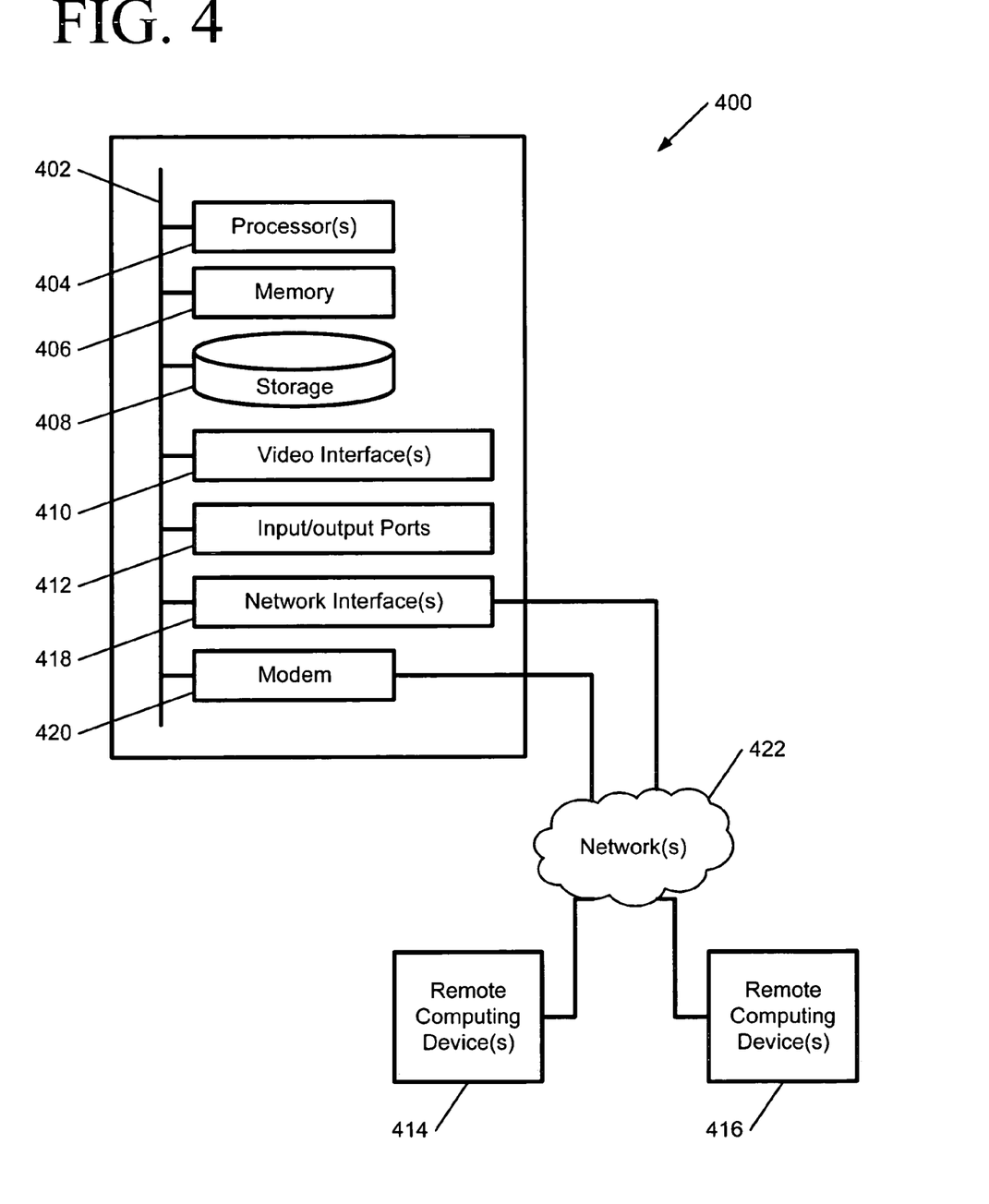
FIG. 4 illustrates a suitable computing environment in which certain aspects of the invention may be implemented.

FIG. 4 and the following discussion are intended to provide a brief, general description of a suitable environment in which certain aspects of the illustrated invention may be implemented. As used herein below, the term "machine" is intended to broadly encompass a single machine, or a system of communicatively coupled machines or devices operating together. Exemplary machines include computing devices such as personal computers, workstations, servers, portable computers, handheld devices, e.g., Personal Digital Assistant (PDA), telephone, tablets, etc., as well as transportation devices, such as private or public transportation, e.g., automobiles, trains, cabs, etc.

Typically, the environment includes a machine 400 that includes a system bus 402 to which is attached processor(s) 404, a memory 406, e.g., random access memory (RAM), read-only memory (ROM), or other state preserving medium, storage devices 408, a video interface 410, and input/output interface ports 412. The machine may be controlled, at least in part, by input from conventional input devices, such as keyboards, mice, etc., as well as by directives received from another machine, interaction with a virtual reality (VR) environment, biometric feedback, or other input source or signal.

The machine may include embedded controllers, such as programmable or non-programmable logic devices or arrays, Application Specific Integrated Circuits, embedded computers, smart cards, and the like. The machine may utilize one or more connections to one or more remote machines 414, 416, such as through a network interface 418, modem 420, or other communicative coupling. Machines may be interconnected by way of a physical and/or logical network 422, an intranet, the Internet, local area networks, and wide area networks. One skilled in the art will appreciated that communication with network 422 may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including memory 406, solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, such as processor(s) 404, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network. And, although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

Thus, for example, with respect to the illustrated embodiments, assuming machine 400 embodies the software based digital media player 104 of FIG. 1, then remote machines 414, 416 may respectively be multiple digital media servers 102. It will be appreciated that remote machines 414, 416 may be configured like machine 400, and therefore include many or all of the elements discussed for machine.

Having described and illustrated the principles of the invention with reference to illustrated embodiments, it will be recognized that the illustrated embodiments can be modified in arrangement and detail without departing from such principles. And, though the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. Consequently, in view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto.

What is claimed is:

1. A system for validating interaction with a digital media server (DMS) having media associated therewith, the system comprising:
   a display;
   a processor; and
   a tangible computer-readable storage medium coupled to the processor, and having stored therein a plurality of programming instructions configured to be executed by the processor to implement a software-based Digital Music Player (DMP) communicatively coupled between the display and the DMS and is configured to communicate with the DMS over a network, wherein the DMP is configured to render media and to emulate a hardware-based DMP;
   wherein the DMP is implemented to include:
      a receiver configured to receive media streamed from the DMS;
      a filter configured to filter communication with the DMS according to selected criteria, wherein the communication includes streamed media packets, messages and commands, wherein the messages further include Universal Plug and Play (UPnP) messages received from the DMS;
      an inspector configured to monitor and inspect the filtered communication to detect errors in the filtered communication caused by the DMS and log said UPnP messages received from the DMS;
      a monitor configured to detect errors caused by the DMP;
      an analyzer configured to repackage the communication with the DMS in a form that can be read by a user of the DMP, to measure a display frame-rate for media received from the DMS, to measure an absolute time of arrival when a media frame is received from the DMS, to measure a rate of media received from the DMS;
      a display manager configured to display the repackaged communication and errors detected by the inspector and the monitor to facilitate identifying sources of the errors and debugging accordingly; and
      a setter configured to set a power state of a machine performing the method based on said monitored communication with the DMS.

2. The system of claim 1, wherein the DMP is further implemented to include:
   a component interface to expose an operational state the of the system during its communication with the DMS; and
   a validator communicatively coupled with the component interface and the display manager, configured to validate operation of at least the system.

3. The system of claim 1, wherein the DMP is implemented to operate within a machine.

4. The system of claim 3, wherein the DMP is compatible with both the Networked Media Product Requirements (NMPR) and Digital Living Network Alliance (DLNA) Home Networked Device Interoperability Guidelines.

5. The system of claim 1, wherein the inspector is further configured to render said UPnP messages.

6. The system of claim 1, wherein the DMP is further implemented to include a receiver decoder configured to perform, based on said communication with the DMS and said streamed media from the DMS, decoding of media formats defined in Digital Living Network Alliance (DLNA), including at least lossy digital image encoding, lossy digital video encoding, and digital audio encoding.

7. The system of claim 6, wherein the receiver decoder is further configured to provide:
   a rendering control, including control for at least Play, Stop, Pause, Rewind, and Fast Forward; and
   a volume control to set a volume for media being rendered.

8. The system of claim 1, wherein the DMP is further implemented to include
   a network interface configured to communicatively couple the DMP to the network, facilitate the communication with the DMP over the network and monitor all network traffic on the network.

9. A method for validating interaction with a digital media server (DMS) having media associated therewith, the method comprising:
- receiving by a software-based Digital Music Player (DMP), media streamed from the DMS, wherein the DMP is implemented by execution of a plurality of instructions stored in a tangible storage of a machine;
- filtering by the DMP, communication with the DMS according to selected criteria, wherein the communication being selected from the list of communication consisting of streamed media packets, messages and commands, wherein the messages further include Universal Plug and Play (UPnP) messages received from the DMS;
- monitoring and inspecting by the DMP, the filtered communication with the DMS to detect error in the filtered communication caused by the DMS;
- detecting, by the DMP, errors caused by the DMP;
- logging by the DMP, said UPnP messages received from the DMS;
- analyzing by the DMP, said monitored communication with the DMS to measure a display frame-rate for media received from the DMS;
- analyzing by the DMP, said monitored communication with the DMS to measure an absolute time of when a media frame is received from the DMS;
- analyzing by the DMP, said monitored communication with the DMS to measure a rate of media received from the DMS;
- setting by the DMP, a power state of the machine performing the method based on said monitored communication with the DMS;
- repackaging by the DMP, the communication with the DMS in a form that can be read by a user; and
- displaying by the DMP, the repackaged communication and errors detected to facilitate identifying sources of the errors and debugging accordingly.

10. The method of claim 9, further comprising determining by the DMP, an operational state of the DMP.

11. The method of claim 9, further comprising the DMP operating according to a protocol, and DMP validating compliance with the protocol based at least in part on said monitored communication.

12. The method of claim 9, further comprising:
- placing by the DMP, a network interface of the DMP to a network into a mode such that the network interface accepts all network traffic received from the network; and
- filtering by the DMP, said received network traffic to retain selected communication with the DMS.

13. An article comprising a non-transitory tangible machine-readable storage medium having one or more associated instructions for validating interaction with a digital media server (DMS) having media associated therewith, wherein the one or more instructions, upon execution by a machine operating a software-based Digital Music Player (DMP), result in the machine performing operations including:
- receiving by the DMP, media streamed from the DMS;
- filtering by the DMP, communication with the DMS according to selected criteria, wherein the communication being selected from the list of communication consisting of the streamed media packets, messages and commands, wherein the messages further include Universal Plug and Play (UPnP) messages received from the DMS;
- monitoring and inspecting by the DMP, the filtered communication with the DMS to detect error in the filtered communication caused by the DMS;
- detecting, by the DMP, errors caused by the DMP;
- repackaging by the DMP, the communication with the DMS in a form that can be read by a user;
- displaying by the DMP, the repackaged communication and errors detected to facilitate identifying sources of the errors and debugging accordingly;
- logging by the DMP, said UPnP messages received from the DMS;
- analyzing by the DMP, said monitored communication with the DMS to measure a display frame-rate for media received from the DMS;
- analyzing by the DMP, said monitored communication with the DMS to measure an absolute time of when a media frame is received from the DMS;
- analyzing by the DMP, said monitored communication with the DMS to measure a rate of media received from the DMS; and
- setting by the DMP, a power state of the machine performing the method based on said monitored communication with the DMS.

14. The article of claim 13, wherein the instructions, when executed, further results in the machine operating the DMP performing operations including:
- determining by the DMP, an operational state of the DMP.

15. The article of claim 13, wherein the instructions, when executed, further results in the machine operating the DMP performing operations including:
- validating by the DMP, compliance with a protocol, based at least in part on said monitored communication.

16. The article of claim 13, wherein the instructions, when executed, further results in the machine operating the DMP performing operations including:
- monitoring UPnP messages received from the DMS.

17. An article comprising a non-transitory tangible machine-readable storage medium having one or more associated instructions for validating interaction with a digital media server (DMS) having media associated therewith, wherein the one or more instructions, upon execution by a machine operating a software-based Digital Music Player (DMP), results in the machine performing operations including:
- receiving media streamed from the DMS;
- filtering communication with the DMS according to selected criteria, wherein the communication being selected from the list of communication consisting of the streamed media packets, messages and commands, wherein the messages further include Universal Plug and Play (UPnP) messages received from the DMS;
- monitoring and inspecting the filtered communication with the DMS to detect error in the filtered communication;
- repackaging the communication with the DMS in a form that can be read by a user; and
- displaying by the DMP, the repackaged communication and errors existing in the repackaged communication;
- logging said UPnP messages received from the DMS;
- analyzing said monitored communication with the DMS to measure a display frame-rate for media received from the DMS;
- analyzing said monitored communication with the DMS to measure an absolute time of when a media frame is received from the DMS;
- analyzing said monitored communication with the DMS to measure a rate of media received from the DMS; and
- setting a power state of the machine performing the method based on said monitored communication with the DMS.

* * * * *